(12) United States Patent
Klemen et al.

(10) Patent No.: US 11,015,476 B2
(45) Date of Patent: May 25, 2021

(54) ELECTRICAL ENERGY GENERATING SYSTEM

(71) Applicant: Rolls-Royce Corporation, Indianapolis, IN (US)

(72) Inventors: Donald Klemen, Carmel, IN (US); Russell E. White, Indianapolis, IN (US); Eric E. Wilson, Mooresville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/410,837

(22) Filed: May 13, 2019

(65) Prior Publication Data
US 2020/0362720 A1 Nov. 19, 2020

(51) Int. Cl.
| | | |
|---|---|---|
| *F01D 15/10* | (2006.01) | |
| *H02K 7/18* | (2006.01) | |
| *F02C 6/08* | (2006.01) | |
| *B64D 27/10* | (2006.01) | |
| *B64D 27/24* | (2006.01) | |
| *B64D 27/02* | (2006.01) | |

(52) U.S. Cl.
CPC ............ *F01D 15/10* (2013.01); *B64D 27/02* (2013.01); *B64D 27/10* (2013.01); *B64D 27/24* (2013.01); *F02C 6/08* (2013.01); *H02K 7/1823* (2013.01); *B64D 2027/026* (2013.01)

(58) Field of Classification Search
CPC ...... F02C 6/08; B64D 27/10; B64D 2027/026
USPC .......................................................... 290/52
See application file for complete search history.

(56) References Cited

U.S. PATENT DOCUMENTS

| | | | |
|---|---|---|---|
| 4,091,613 A | 5/1978 | Young | |
| 4,706,908 A | 11/1987 | Huffman et al. | |
| 7,464,533 B2 | 12/2008 | Wollenweber | |
| 8,669,670 B2 | 3/2014 | Donnelly et al. | |
| 9,010,114 B2 | 4/2015 | Krug et al. | |
| 9,309,811 B2 * | 4/2016 | Swann ............... | G01N 21/538 |
| 9,440,746 B2 * | 9/2016 | Swann ............... | B64D 45/00 |
| 9,932,903 B2 * | 4/2018 | Pidcock ............. | F02C 7/222 |
| 2003/0014979 A1 * | 1/2003 | Summerfield ...... | F23R 3/28 |
| | | | 60/776 |
| 2018/0134397 A1 | 5/2018 | Himmelmann et al. | |

* cited by examiner

*Primary Examiner* — Charles Reid, Jr.
(74) *Attorney, Agent, or Firm* — Shumaker & Sieffert, P.A.

(57) ABSTRACT

In examples, a propulsion and electrical generation system including a gas turbine engine including a compressor and a bleed air outlet from the compressor, wherein the compressor is configured to compress a fluid, wherein a portion of the compressed fluid is directed out of the bleed air outlet to define bleed air from the compressor; and a turbo-generator including a combustor, wherein the combustor includes a fuel inlet and a bleed air inlet, wherein the bleed air inlet is in fluid communication with the bleed air outlet from the compressor, wherein the combustor is configured to receive the bleed air via the bleed air inlet from the bleed air outlet of the gas turbine engine and receive fuel via the fuel inlet, wherein the combustor is configured to combust the received fuel with the received bleed air, wherein the turbo-generator is configured to generate electrical energy via the combustion of the fuel by the combustor.

20 Claims, 11 Drawing Sheets

ELECTRICAL ENERGY GENERATING SYSTEM

TECHNICAL FIELD

The present disclosure relates to electrical systems for gas engine turbine powered vehicles, such as aircraft.

BACKGROUND

A gas turbine engine is a type of internal combustion engine that may be used to power an aircraft, or another moving vehicle. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive a propulsor, and the propulsor may use the energy from the rotating shaft to provide propulsion for the system.

Gas turbine engine powered vehicles, such as aircraft, increasingly use electrical systems which may operate to provide auxiliary functions beyond vehicle propulsion. Electrical systems may be used to replace mechanical, hydraulic, and pneumatic drive systems in gas turbine engine powered vehicles. Gas turbine engine powered vehicles may include electrical energy generating systems to supply power for the electrical systems.

SUMMARY

The present disclosure is directed to electrical energy generating system and techniques that provide electrical energy to electrical systems of a gas turbine engine power vehicle. In some examples, the electrical energy generating system may include a turbo-generator having a combustor that drives rotation of a turbine. Rotation of the turbine drives a generator, which converts the mechanical energy to electrical energy. Rather than employing a dedicated compressor that functions only to compress a fluid that is directed to the combustor of the turbo-generator, the combustor of the turbo-generator may be fluidically coupled to a bleed air output from a compressor of a gas turbine engine. The gas turbine engine supplying the compressed bleed air may be one or more of the engines used primarily for propulsion of the vehicle, such as an aircraft. While the turbo-generator may receive bleed air from the compressor of the gas turbine engine, the combustor of the turbo-generator may be fueled independently from that of the combustor of the gas turbine engine. In some examples, the exhaust from the gas turbine engine of the vehicle may be fluidically coupled to the exhaust of the turbo-generator. Coupling without mechanical means allows integration to existing engines without significant modifications for mechanical loading. Improvements in power density and efficiency are possible by proper selection of operating speeds. In addition, the speeds allow for increases in inertia, driving of pressurization systems, as requested.

In some examples, the present disclosure is directed to a propulsion and electrical generation system comprising a gas turbine engine including a compressor and a bleed air outlet from the compressor, wherein the compressor is configured to compress a fluid, wherein a portion of the compressed fluid is directed out of bleed air outlet to define bleed air from the compressor; and a turbo-generator including a combustor, wherein the combustor includes a fuel inlet and a bleed air inlet, wherein the bleed air inlet is in fluid communication with the bleed air outlet from the compressor, wherein the combustor is configured to receive the bleed air via the bleed air inlet from the bleed air outlet of the gas turbine engine and receive fuel via the fuel inlet, wherein the combustor is configured to combust the received fuel with the received bleed air, and wherein the turbo-generator is configured to generate electrical energy via the combustion of the fuel by the combustor.

In some examples, the present disclosure is directed to a method comprising compressing a fluid via a compressor of a gas turbine engine; wherein a portion of the compressed fluid is directed out of a bleed air outlet of the compressor to define bleed air from the compressor; receiving the bleed air via a bleed air inlet of a combustor of a turbo-generator, wherein the bleed air inlet of the combustor is in fluid communication with the bleed air outlet of the gas turbine engine; receiving a fuel via a fuel inlet of the combustor of the turbo-generator with the received bleed air; and combusting the received fuel with the received bleed air with the combustor of the turbo-generator, wherein the turbo-generator is configured to generate electrical energy via the combustion of the fuel by the combustor.

The details of one or more examples are set forth in the accompanying drawings and the description below. Other features, objects, and advantages will be apparent from the description and drawings, and from the claims.

DETAILED DESCRIPTION

The present disclosure is directed to electrical energy generating system and techniques that provide electrical energy to electrical systems of a gas turbine engine powered vehicle. For ease of description, examples of the disclosure will be primarily described in the context of aircraft as a gas turbine engine power vehicle. However, examples of the disclosure are not limited to aircraft.

Gas turbine engine power aircraft increasingly require significant amount of additional power beyond that generated by the one or more gas turbine engines used by the aircraft for main propulsion. In some examples, electrical systems may be used to replace mechanical, hydraulic, and pneumatic drive systems in gas turbine engine powered vehicles, while also providing one or more auxiliary functions to the aircraft not directly related to propulsion. Those electrical systems may increase the electrical load requirements for the vehicle.

In some examples, electrical generators or other auxiliary power systems may be employed by gas turbine combustion engine power aircraft to satisfy the transient and/or continuous electrical loads associated with the electrical system(s). However, the addition of such power generating systems may result in the addition of more volume and weight to the aircraft than is desirable, particularly in weight sensitive aircraft. Integrating electrical generator systems directly into gas turbine engines may require significant design integration work, particularly in the case of retrofitting existing aircraft with such electrical generator systems.

In accordance with examples of this disclosure, a vehicle system including a gas turbine engine for propulsion may additionally include a turbo-generator configured to generate electrical energy for the vehicle system (e.g., electrical systems of the vehicle system that require electrical energy to operate). Rather than include a compressor dedicated to supplying compressed fluid to a combustor of the turbo-generator, the combustor of the turbo-generator may receive compressed fluid in the form of bleed air from one or more compressors of the primary propulsion gas turbine engine/engines. The compressed fluid may be mixed with a fuel within the combustor and combusted to drive a turbine that drives a generator that generates electrical energy. In some examples, the exhaust stream from the turbo-generator may be fluidically coupled to the exhaust stream from the gas turbine engine.

The turbo-generator and gas turbine engine may provide for a parallel combustion system in which the same compressor supplies compressed air to the respective combustors of the gas turbine engine and turbo-generator of the system. In some examples, the fuel supplied to the combustor of the turbo-generator may be controlled independently from the fuel supplied to the combustor of the gas turbine engine for operation of the engine. For example, the amount of fuel supplied to the combustor of the turbo-generator may be increased or decreased while the amount of fuel supplied to the combustor of the gas turbine engine may be relatively constant, and vice versa.

In some examples, systems of this disclosure may provide a parallel combustion power turbine system. Using bleed air from a primary compressor of the main propulsion system to an independently fuelled turbo-generator may provide for one or more advantages. In some examples, the turbo-generator may be mounted directly or in close proximity to the gas turbine engine. The bleed air from the compressor of the gas turbine engine may be directed into the combustor of the turbo-generator and the exhaust of the turbo-generator may be tied to the gas turbine engine exhaust. Such a design may eliminate additional fluid inlets and exhausts, maintains observable factors, and, provides for a "bolt-on" approach to adding one or more turbo-generator to an aircraft system that does not require mechanical connection to the gas turbine engine.

In other examples, rather than being "bolted on" or otherwise attached directly to a gas turbine engine, the turbo-generator may be fluidically couple to the bleed air output of the gas turbine engine in a relatively remote location, e.g., in the fuselage of an aircraft. In such an example, the combustor of the turbo engine may receive bleed air from multiple gas turbine engines of the vehicle rather than a single gas turbine engine. In some examples, this system purposely allows inertia to be adjusted to provide smoothing of drive load depending on system requirements, addition of additional compression stages to improve output at high altitudes, and, drive of additional cooling systems if required or otherwise desired. In some examples, systems of the disclosure provide an independent speed controlled generator system which can be used on multiple engine platforms, without changes to the mechanical system of the engine.

In some examples, systems of the disclosure may allow for nearly constant speed drive improving generator performance, and where the generator is an add on which does not require engine re-certification.

In some examples, such an approach allows a commercial aircraft engine to be coupled with a high-power module including a turbo-generator without change to the base engine. Such power generating module including a turbo-generator may be used to supply the increasing demands of commercial aircraft. Twin shaft gas turbine engines may have an advantage as the compressor may be allowed to speed up to provide the additional compressed fluid flow for the turbine-combustor-generator system. The increase in the speed of the compressor of the gas turbine engine to supply the turbo-generator with bleed air may result in an increase in thrust generated by the gas turbine engine. The size of such the turbine-combustor-generator system may be relatively small since it does not require a compressor and/or a starter, and the generator can be sized directly with the turbo system. In some examples, the system may be used with single, twin, and quad engine systems, with the output of the generator systems being tied to a common power bus.

Some examples of the disclosure may relate to miniaturization of generator systems to provide high power for aircraft systems. In some examples, the system effectively uses bleed air from existing engines to an independently controlled combustor and turbine to drive a generator. This may provide a means of independent speed control of the generator & utilizes the work of the primary turbine to drive the compressor. With this system, the efficiency of the system may not be compromised. An independent system may be designed to an optimum or otherwise desired speed and is not limited by the speed of the engine components. An independent system may also eliminate shaft, gear and bearing power limits associated with mechanical drive. In some examples, the system provides a Brayton cycle efficiency and does not require additional aircraft inlets, exhaust and thermal suppression. The generator speed can be increased to improve power density.

Figure 1:
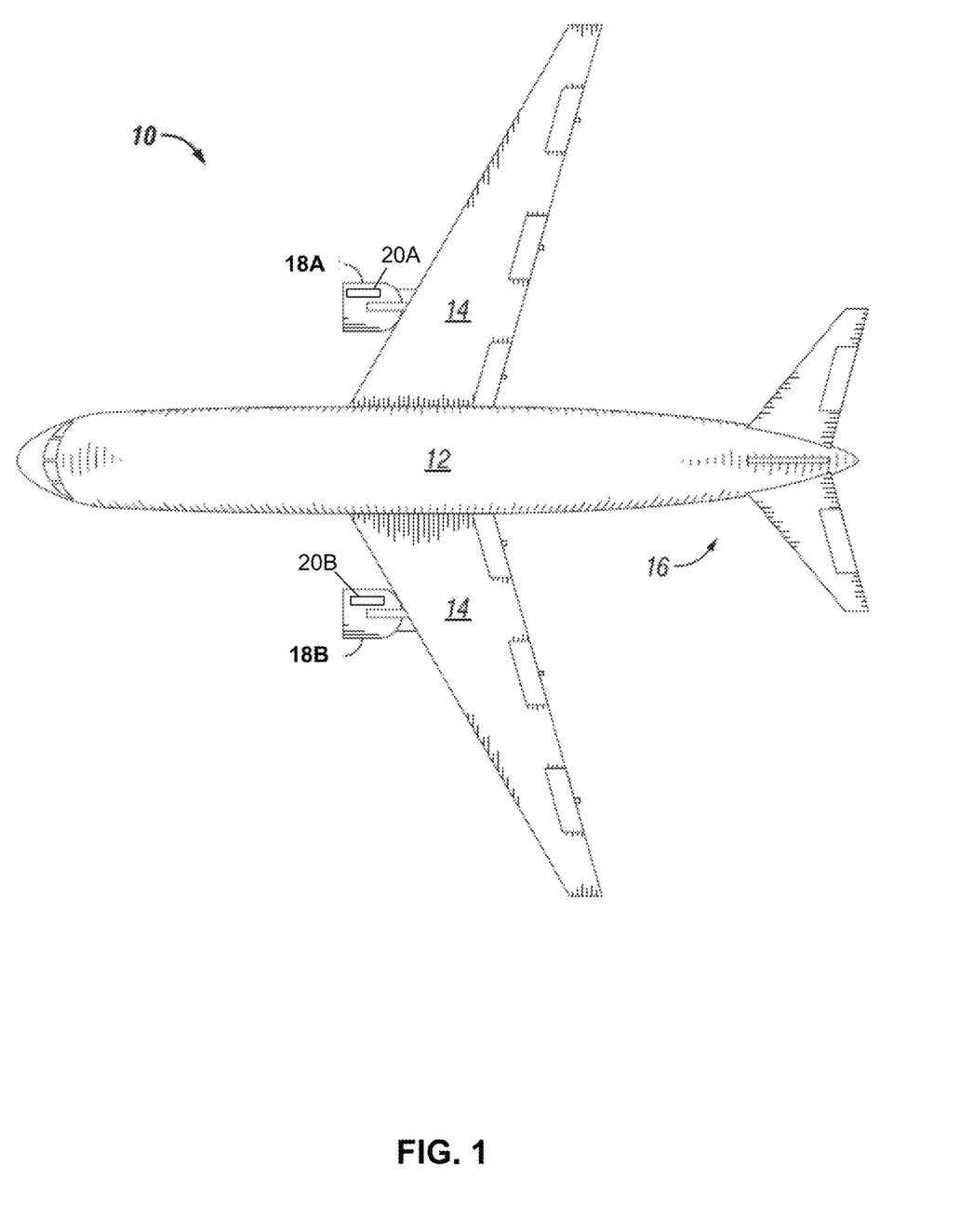
FIG. 1 is a conceptual diagram illustrating an example vehicle in accordance with an example of the present disclosure.

FIG. 1 is a conceptual diagram illustrating an example vehicle in accordance with an example of the present disclosure. In the example of FIG. 1, the vehicle includes an aircraft 10. In other examples, the vehicle may include any type of gas turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous.

Aircraft 10 includes a fuselage 12, wings 14, an empennage 16, two gas turbine engines 18A and 18B (collectively, "gas turbine engines 18"), and two turbo-generators 20A and 20B (collectively "turbo-generators 20"). In other examples, aircraft 10 may include a single gas turbine engine 18 or a plurality of propulsion systems 18. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft. Aircraft 10 may employ any number of wings 14. Empennage 16 may employ a single or multiple flight control surfaces. Gas turbine engines 18 may be the main propulsion systems of aircraft 10.

In accordance with some examples of the disclosure, turbo-generators 20 may be fluidically coupled to gas turbine engines 18 to receive a compressed fluid in the form bleed air from gas turbine engines 18. As will be described further below, the bleed air may be directed from respective compressor(s) of gas turbine engines 18 to respective combustors of turbo-generators 20, e.g., rather than turbo-generators 20 each including dedicated compressor configured to solely supply the respective combustors of turbo-generators 20 for operation in generating electrical energy.

In some examples, turbo-generators 20 may be mounted directly to gas turbine engines 18. As shown in FIG. 1, turbo-generator 20A is mounted directly to gas turbine engine 18A and turbo-generator 20B is mounted directly to gas turbine engine 18B. Additionally, or alternatively, one or more turbo-generators 20 may be fluidically coupled to the bleed air outlet of gas turbine engines at a remote location of aircraft 10, e.g., where the one or more turbo-generators 20 are located within fuselage 12 of aircraft 10. While a single turbo-generator 20A and 20B is mounted to each gas turbine engine 18A and 18B, in other examples, multiple turbo-generators may be mounted to each individual gas turbine engine, where each of the multiple turbo-generators are fluidically coupled to the bleed air outlet of the gas turbine engine. In other examples, gas turbine engine 18A may include one or more turbo-generators 20 fluidically couple to while gas turbine engine 18B may include no turbo-generators 20.

Figure 2:
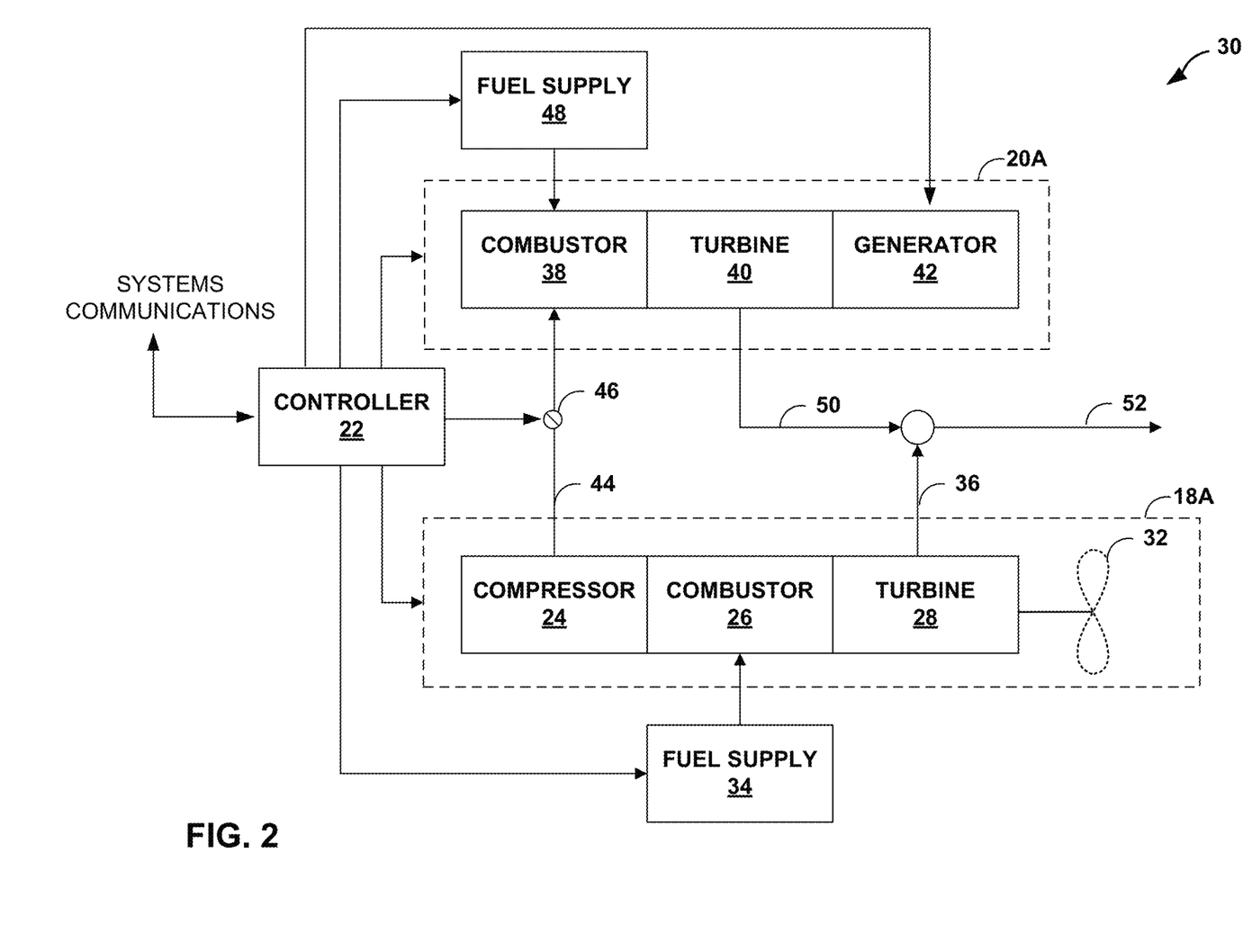
FIG. 2 is a conceptual and schematic diagram illustrating another example propulsion and electrical energy generation system in accordance with an example of the present disclosure.

FIG. 2 is a conceptual and schematic diagram illustrating propulsion and electrical energy generation system 30 in accordance with an example of the present disclosure. System 30 includes gas turbine engine 18A and turbo-generator 20A of FIG. 1. FIG. 2 is described with regard to gas turbine engine 18A and turbo-generator 20A of FIG. 1 for ease of description. Such description is applicable to gas turbine engine 18B and turbo-generator 20B of FIG. 1.

Propulsion and electrical energy generation system 30 includes gas turbine engine 18A as a main engine, i.e., a main propulsion engine, turbo-generator 20A, and controller 22. Although described herein as with respect to an aircraft propulsion system, in other examples, gas turbine engine 18A may be a propulsion system for providing propulsive thrust to any type of gas turbine engine powered vehicle, as discussed above, or configured to provide power any suitable nonvehicle system including gas turbine engine 18A.

Engine 18A is a primary propulsion engine that provides thrust for flight operations of aircraft 10. In some examples, engine 18A may be a two-spool engine having a high pressure (HP) spool and a low pressure (LP) spool. In other examples, engine 18A may include three or more spools, e.g., may include an intermediate pressure (IP) spool and/or other spools. In some examples, engine 18A is a turbofan engine, where the LP spool is operative to drive a propulsor in the form of a turbofan (fan) system. In other examples, engine 18A may not include a LP spool or fan system. In some examples, engine 18A may include any suitable turbine powered-engine propulsion system, including but not limited to, a turbojet engine or a turboprop engine.

As illustrated in FIG. 2, engine 18A includes compressor 24 (e.g., at least one compressor), combustor 26 (e.g., at least one combustor), turbine 28 (e.g., at least one turbine), and propulsor 32 (e.g., at least one propulsor). Combustor 26 is fluidically disposed between compressor 24 and turbine 28 (e.g., disposed between compressor 24 and turbine 28 such that air or another fluid may flow from compressor 24 to combustor 26 to turbine system 28).

Compressor 24 may be configured to compress fluid, such as intake air or another gas and selectively provide the compressed fluid to combustor 26. Although not shown in FIG. 2, compressor 24 may be operably coupled to turbine 28, e.g., by a shaft. Compressor 24 may receive fluid from an intake, compress the fluid, and distribute compressed fluid to combustor 26. Compressor 24 may be an axial compressor, a centrifugal compressor, or another type of compressor that produces compressed fluid.

In some examples, compressor 24 may include a single compressor or at least two compressors. For example, compressor 24 may include a low pressure (LP) compressor and (e.g., followed by) a high pressure (HP) compressor, where the HP compressor is driven by a different shaft than that of the LP compressor. In such cases, the speed of the shaft driving the HP compressor may be different from that of the speed of the shaft driving the LP compressor.

Combustor 26 is configured to receive the compressed fluid from compressor 24 in addition to fuel from fuel supply 34. Combustor 26 is further configured to introduce the received fluid and ignite the compressed fluid, thus combusting the fuel to generate energy. The energy generated by igniting the compressed fluid in combustor 26 may be extracted by turbine 28, causing a shaft to which turbine 28 is coupled to rotate, thereby driving propulsor 32. Combustor 26 may be a single combustor or at least two combustors. In some examples, combustor 26 includes a combustion liner (not shown) that encloses a continuous combustion process. In other examples, combustor 26 may take other forms, and may be, for example, a wave rotor combustion system, a rotary valve combustion system, a pulse detonation combustion system, or a slinger combustion system, and may employ deflagration and/or detonation combustion processes.

Turbine 28 may be fluidically coupled to combustor 26 such that turbine 28 receives moving, combusted fluid from combustor 26 and converts energy of the moving fluid to mechanical energy (e.g., via a rotating shaft). The rotating shaft of turbine 28 may drive propulsor 32 to produce propulsion for system 30 (e.g., used to propel vehicle 10). Turbine 28 may be a single turbine or at least two turbine, and may include any suitable type of turbine. Turbine 28 includes an exhaust outlet to expel fluid exhaust 36 from turbine 28 resulting from the combustion of the compressed fluid.

In addition to gas turbine engine 18A, system 30 includes turbo-generator 20A that is configured to generate electrical energy (e.g., electrical power) for system 30. As will be described in further detail below, the electrical energy generated by turbo-generator 20A may be used to supply electrical power used to operate, at least in part, one or more electrical systems of vehicle 10 that require electrical load to operate. As shown, turbo-generator 20A includes combustor 38, turbine 40, and generator 42. Combustor 38 and turbine 40 are separate from combustor 26 and turbine 28 of gas turbine engine 18A, e.g., in that combustor 38 and turbine 40 are operably coupled to drive generator 42 while combustor 26 and turbine 28 are operably coupled to drive propulsor 32.

Combustor 38 is configured to receive a compressed fluid in addition to fuel from fuel supply 48. While fuel supply 48 is shown as being separate from fuel supply 34 in FIG. 2, in other examples, combustor 38 may be supplied with fuel from the same source as combustor 26. Regardless of whether or not the fuel supplies are separate or the same for combustor 38 and combustor 26, in some examples, the fuel may be supplied (e.g., the amount supplied) to combustor 38 independently from that of combustor 26, e.g., under the control of controller 22.

Rather than including a separate compressor dedicated to providing compressed fluid to combustor 38, turbo-generator 20A is configured to receive compressed fluid from compressor 24 of engine 18A, in the form of bleed air from compressor 24. As shown in FIG. 2, compressor 24 includes a bleed air outlet through which bleed air 44 is directed to combustor 38. The fluid compressed by compressor 24 defines the bleed air exiting compressor via the bleed air outlet. Bleed air valve 46 is located between compressor 24 and combustor 38 and may be actuated or otherwise operated by controller 22 to control the amount of bleed air 44 (e.g., flow rate) supplied to combustor 38. Combustor 38 may be configured such that bleed air 44 is the only compressed fluid received during operation of turbo-generator 20A, e.g., without receiving another compressed fluid in addition to the bleed air during operation combustor 38. Combustor 38 may receive bleed air 44 without bleed air 44, e.g., being compressed by another compressor after leaving compressor 24 of gas turbine engine 18A, being expanded by an expander, and/or acted on by another mechanism that modifies the compression of bleed air 44.

In some examples, by supplying combustor 38 with compressed fluid in the form of bleed air from compressor 24 of gas turbine engine 18A, turbo-generator 20A may be combined with or otherwise incorporated (e.g., retrofit) with gas turbine engine 18A without adding weight and/or volume resulting from an additional compressor(s) to the weight and/volume of gas turbine engine 18A. For example, turbo-generator 20A may not include a separate compressor shaft that would otherwise be required to provide compressed fluid to combustor 38 to operate turbo-generator 18A to generate electrical energy.

Combustor 38 is configured to introduce the received compressed fluid in the form of bleed air 44 and ignite the fuel with the compressed fluid to generate energy. The ignition of the fuel combusts the fuel. The energy generated by igniting the compressed fluid in combustor 38 may be extracted by turbine 40, causing a shaft to which turbine 28 is coupled to rotate. Combustor 38 may be a single combustor or at least two combustors. In some examples, combustor 38 includes a combustion liner (not shown) that encloses a continuous combustion process. In other examples, combustor 38 may take other forms, and may be, for example, a wave rotor combustion system, a rotary valve combustion system, a pulse detonation combustion system, or a slinger combustion system, and may employ deflagration and/or detonation combustion processes.

Turbine 40 may be fluidically coupled to combustor 38 such that turbine 40 receives moving, combusted fluid from combustor 38 and converts energy of the moving fluid to mechanical energy (e.g., via a rotating shaft). Generator 42 may then convert the mechanical energy of the rotating shaft to electrical energy. For example, the rotating shaft of turbine 40 may rotate an electromagnetic rotor (also referred to as an armature in some examples) of generator 42 relative to a stator (not shown) that defines a stationary magnetic field to generate electrical current through electromagnetic induction. Turbine 40 may be a single turbine or at least two turbine, and may include any suitable type of turbine.

Generator 42 may be any suitable type of electrical generator configured to generate electrical current from the rotation of the shaft driven by turbine 40. For example, field wound, permanent magnet, reluctance generators which have high speed capability may be employed in some examples of the system, with detailed selection depending on system requirements. The electrical energy generated by generator 42 may be used to provide operational power to one or more electrically operated systems of vehicle 10. In some examples, generator 42 may be configured to generate continuous aircraft or transient system power also defined by the desired end user application. Example electrical systems that may be powered by generator 42 include hydraulic and/or pneumatic drive systems, environmental control systems, communications systems, directed energy systems, radar systems and component cooling systems. Transient loaded systems may require adjustment to the rotating inertia. This may provide another variable available to a system designer for system optimization or adjustment with designs in accordance with some examples of the disclosure.

Turbine 40 includes an exhaust outlet to expel fluid exhaust 50 from turbine 40 resulting from the combustion of the compressed fluid. In the example of FIG. 2, exhaust 50 from turbine 40 is fluidically coupled to exhaust 36 from turbine 28 to form combined turbine exhaust flow 52. For example, a fluid flow conduit defining the flow of exhaust 36 from turbine 28 may be fluidically coupled to another fluid flow conduit defining the flow of exhaust 50 from turbine 40 to a single fluid flow conduit defining combined turbine exhaust 52. In this manner, turbo-generator 20A may not require significant additional exhaust flow conduits beyond that already provided by gas turbine engine 18A. Accordingly, turbo-generator 20A may be easily combined with or otherwise incorporated (e.g., retrofit) with gas turbine engine 18A without adding significant weight and/or volume to the weight and/volume of gas turbine engine 18A. In other examples, exhaust 50 and exhaust 36 may not be combined with each other into single exhaust stream 52.

As described above, propulsion and electrical energy generation system 30 includes controller 22. Controller 22 may include control circuitry that implements control of system 30. Controller 22 may be configured to individually and selectively control the components of system 30 such that system 30 implements the techniques described herein. Controller 22 may comprise any suitable arrangement of hardware, software, firmware, or any combination thereof, to perform the techniques attributed to controller 22 herein. Examples of controller 22 include any of one or more microprocessors, digital signal processors (DSPs), application specific integrated circuits (ASICs), field programmable gate arrays (FPGAs), processing circuitry, or any other equivalent integrated or discrete logic circuitry, as well as any combinations of such components. When controller 22 includes software or firmware, controller 22 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 2, controller 22 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 22 (e.g., may be external to a package in which controller 22 is housed).

Although controller 22 is generally described as being the primary unit for controlling each of the components of system 30 for performing the techniques described herein, in some examples, the individual components of system 30 may include additional functionality for performing some or all of the operations described below with respect to controller 22. For example, a combination of one or more of compressor 24, combustors 26 and 38, turbines 28 and 40, propulsor 32, and generator 42 may include components for controlling the consumption, generation, and distribution of energy throughout system 30 and aircraft 10.

Figure 3:
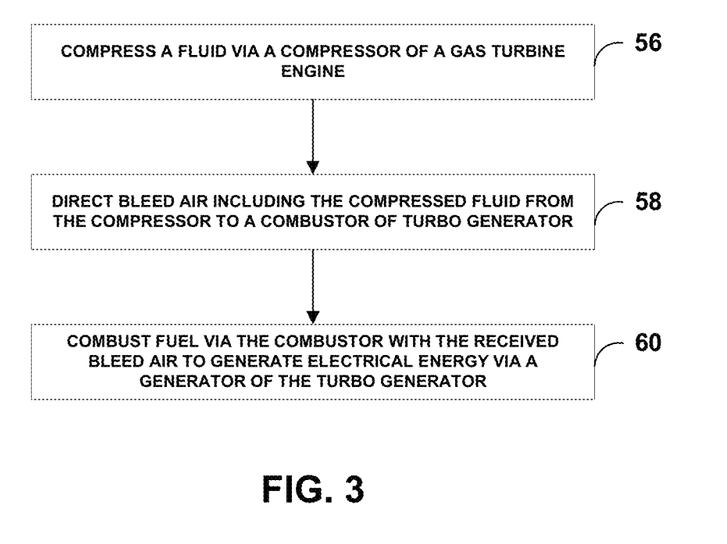
FIG. 3 is a flow diagram illustrating an example technique in accordance with an example of the present disclosure.

FIG. 3 is a flow diagram illustrating an example technique for generating electrical energy using a turbo-generator that receive bleed air from the compressor of a gas turbine engine. For ease of description, the example technique of FIG. 3 is described with respect to system 30 of FIG. 2, although any suitable system may implement the example technique of FIG. 3.

As shown in FIG. 3, controller 22 controls compressor 24 of gas turbine engine 18A to compress an intake fluid, e.g., during operation of gas turbine engine 18A to generate propulsion (56). Controller 22 may then control bleed air control valve 46 to supply combustor 38 of turbo-generator 20A with a portion of the compressed fluid from compressor 24 in the form of bleed air 44 (58). For example, controller 22 may control bleed air control valve 46 such that a portion of the fluid compressed by compressor 24 is received by combustor 38 with another portion being directed to combustor 26 of gas turbine engine. Not all of the compressed fluid from compressor 24 may be supplied to combustor 38 as work is required for the compression. In some examples, the highest mass flow split would be about ⅓ of the compressed fluid being supplied to the combustor 38, which may transition all propulsion to generation.

Figure 9:
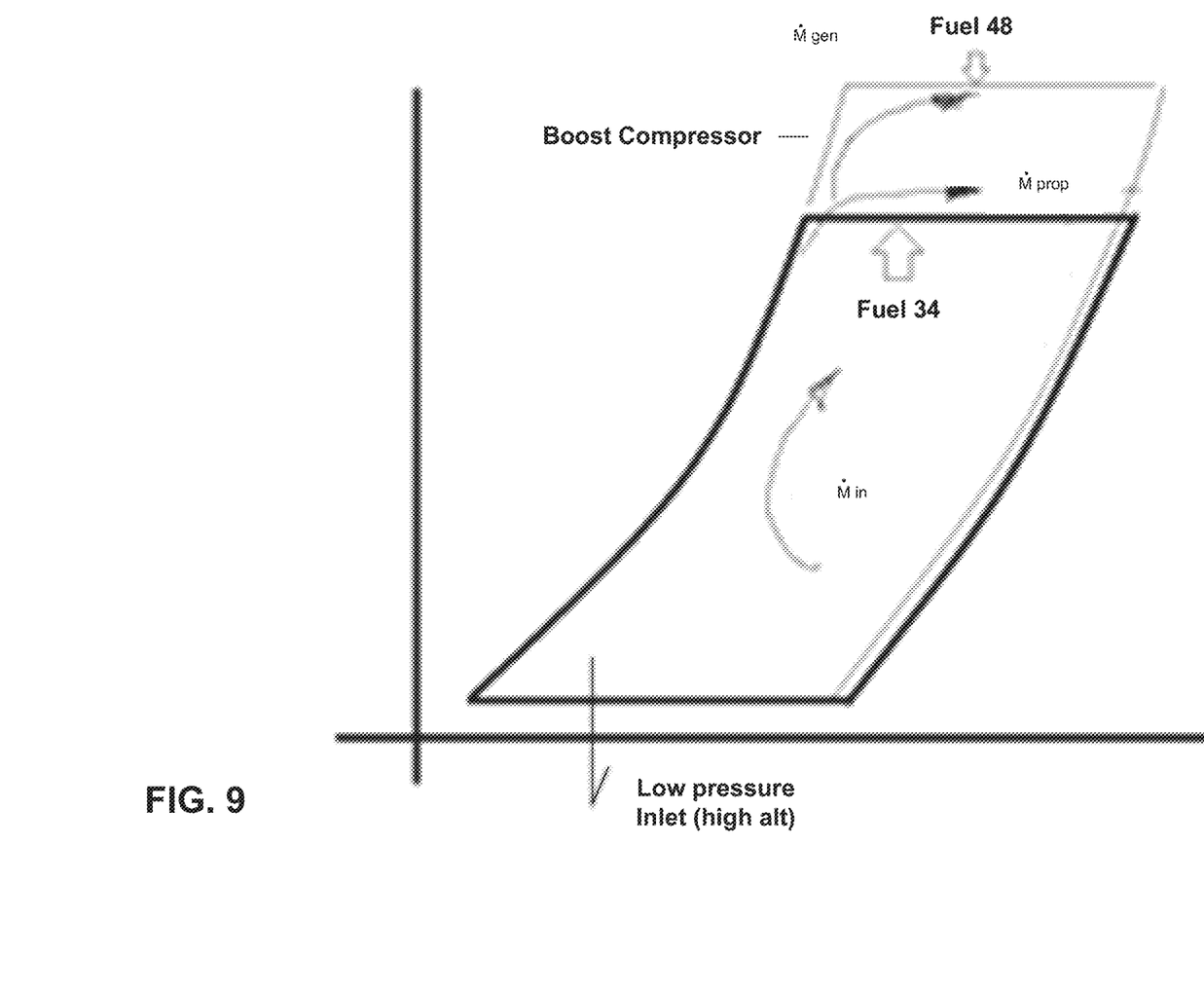
FIG. 9 is diagram showing a cycle both with and without an example boost compressor.

In some examples, the pressure of bleed air 44 from compressor 24 depends on flight and aircraft variables such as altitude, ascending/descending flight, weight, wing area, and the like. In some examples, for extreme altitude applications, additional compressions stage(s) may be added to supplement engine compression. FIG. 9 is a plot showing a cycle both with an example "boost" compressor and without. Pressure may vary about 15 psi to about 450 psi without supplement. Mass flow M must be conserved. Power may be a "map" between propulsion and generation.

In examples in which compressor 24 includes a HP stage and LP stage, bleed air 44 may be supplied from the LP stage, HP stage, or both. As noted above, supplying combustor 38 with bleed air 44 from compressor 24 may cause compressor 24 to speed up, thus resulting in an increase in thrust generated by gas turbine engine 18A. In general, if compressor 24 include multiple stages, bleed air 44 may be supplied from one, more than one, or all of the stages.

Controller 22 may also control fuel supply 48 to supply fuel to combustor 38 of turbo-generator 20A and control fuel supply 34 to supply fuel to combustor 26 of gas turbine engine 18A. Controller 22 may control combustor 38 to ignite and combust the fuel with bleed air 44 received from compressor 24 (60). The ignition and combustion of the fuel with bleed air 44 may cause turbine 40 and generator 42 to generate electrical energy as described above. Similarly, controller 22 may control combustor 26 to ignite and combust the fuel with compressed fluid from compressor 24. The ignition and combustion of the fuel with the compressed fluid may cause turbine 28 and propulsor 32 to generate propulsion for vehicle 10 as described above.

Figure 10:
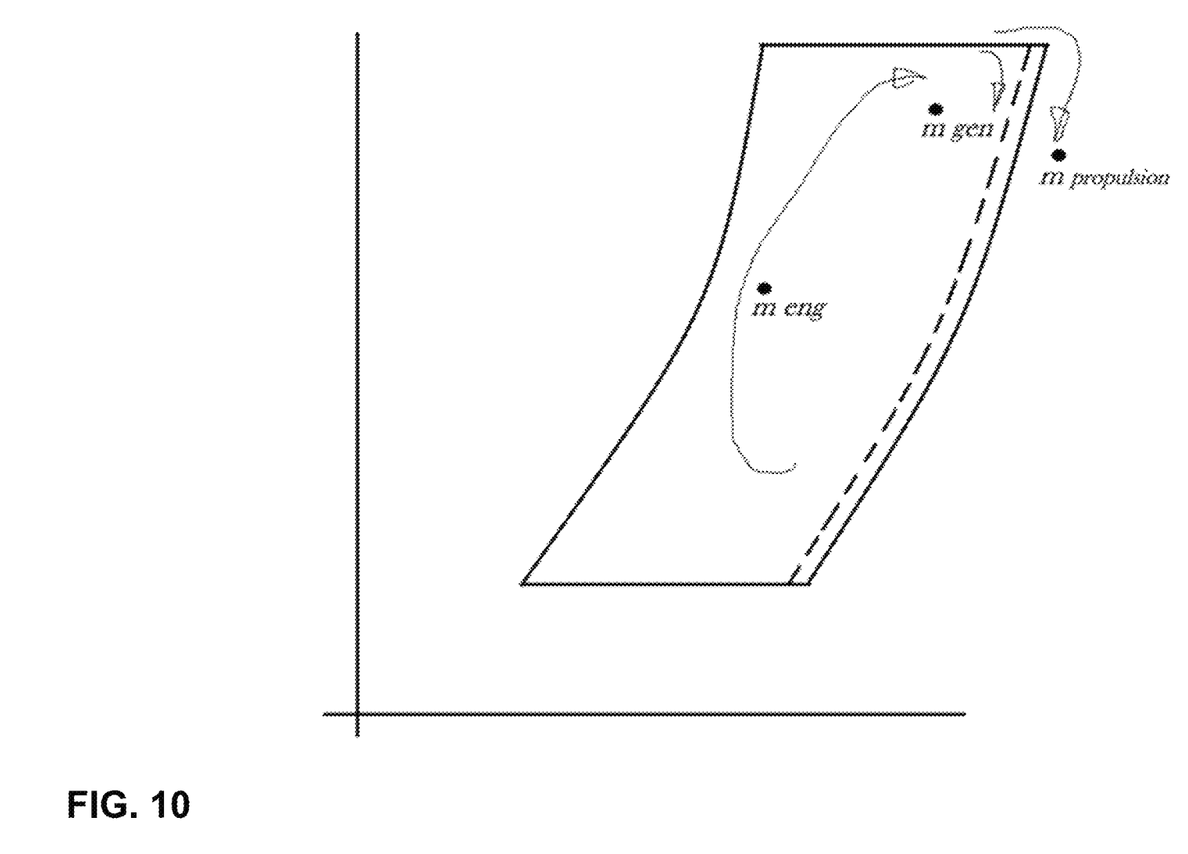
FIG. 10 is a diagram showing the split of inlet mass flow between propulsion and generator for an example cycle.

In some examples, controller 22 may operate system 30 such that combustor 26 and combustor 38 combust with each other in parallel, e.g., as the two combustors are combusting at the same time and driving different turbines. The inlet mass flow of compressor 24 may be split between propulsion and generator as required to adjust output power of each. FIG. 10 is a diagram showing the split of inlet mass flow between propulsion and generator for an example cycle.

During operation of engine 18A and turbo-generator 20A, controller 22 may adjust the amount of compressed fluid supplied to combustor 26 and combustor 38, e.g., by adjusting bleed air control valve 46. For example, controller 22 may increase or decrease the amount of compressed fluid received by combustor 38 by opening or closing, respectively, valve 46 to increase or decrease the amount of bleed air 44 supplied from compressor 24. In some examples, there may be a maximum amount of bleed air 44 that may be supplied from compressor 24 to combustor 38 without significantly or undesirably impacting the amount of propulsion generated by engine 18A. In such examples, controller 22 may be configured to control valve 46 such that the amount of bleed air 44 supplied to combustor 38 is at or below that maximum threshold so as to prevent significantly or undesirably impacting the performance of gas turbine engine 18A. In some examples, bleed air 44 may be about 30% or less of all the compressed fluid flow generated by compressor 24, such as, e.g., from about 1.5% to about 10%. Other values are contemplated.

Controller 22 may be configured to independently control the amount of fuel supplied to combustor 38 by fuel supply 48 relative to the amount of fuel supplied to combustor 26 by fuel supply 34 depending on flight conditions and electrical loads. For example, while the combustion and power generation process of turbo engine 20A may be dependent to some extent on the operation of gas turbine engine 18A, controller 22 may be configured to increase or decrease the amount of fuel supplied to combustor 38 by fuel supply 48 without necessarily making an adjustment to the amount of fuel supplied to combustor 26 by fuel supply 34. In some examples, controller 22 may increase the amount of fuel supplied to combustor 38 by fuel supply 48 without changing the amount of fuel supplied to combustor 26 by fuel supply 34, or vice versa. Similarly, controller 22 may decrease the amount of fuel supplied to combustor 38 by fuel supply 48 without changing the amount of fuel supplied to combustor 26 by fuel supply 34, or vice versa.

As described above, generator 42 is configured to generate electrical energy during operation of turbo-generator 20A using bleed air from compressor 24 of gas turbine engine 18A. Controller 22 may control generator to generate a desired amount of electrical power, e.g., to accommodate transient or static loads of one or more electrical systems of aircraft 10. In some examples, generator 42 may be configured to generate about 10% of engine horsepower (HP) or less, such as, about 5 to about 10% of engine horsepower. Other values are contemplated.

Figure 4:
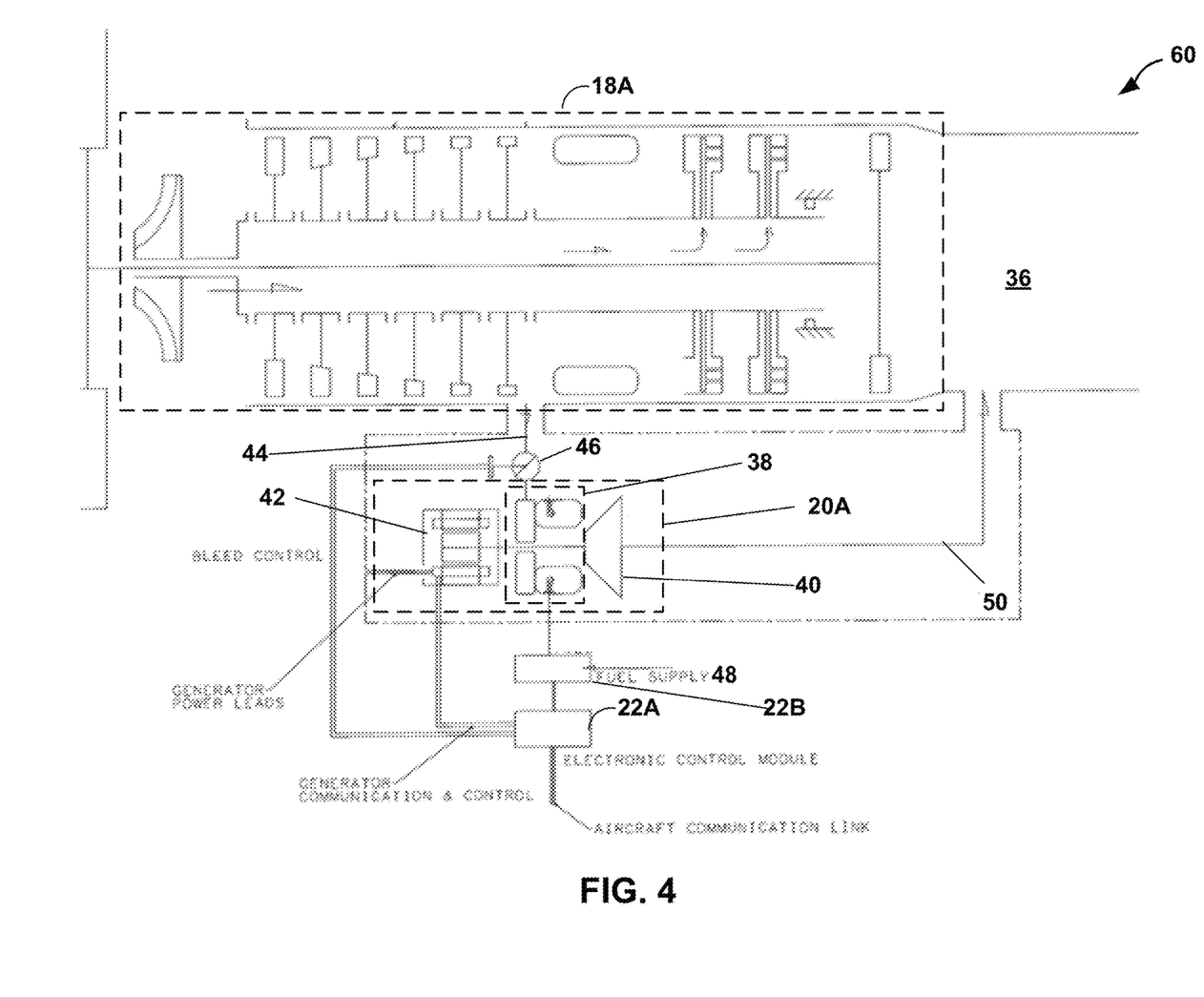
FIG. 4 is a conceptual and schematic diagram illustrating another example propulsion and electrical energy generation system in accordance with an example of the present disclosure.

FIG. 4 is a conceptual and schematic diagram illustrating an example propulsion and electrical energy generation system 60. In some examples, system 60 of FIG. 4 represents one example implementation of the example system of FIG. 2. For ease of description, features that are the same or similar to that of system 30 are numbered similarly.

As shown, system 60 includes gas turbine engine 18A, turbo-generator 20A, electronic control module 22A, and turbo-generator fuel control module 22B. Bleed air 44 may be directed from one or more compressors (not labeled) of gas turbine engine to supply compressed fluid to combustor 38 of turbo-generator 20A. Electronic control module 22A may control the amount of bleed air 44 supplied to combustor 38 by controlling bleed air control valve 46. Fuel may also be supplied to combustor 38 by fuel supply 48 under the control of turbo-generator fuel control module 22B.

Combustor 38 may ignite and combust the received fuel with bleed air 44, which drives turbine 40. The rotation of turbine 40 drive generator 42 which generates electrical energy from turbine 40. Electronic control module 22A also controls the operation of generator 42. For example, control module 22A may control the bleed air distribution valve. In some examples, control module 22A may control the field control of a field wound generator. Control module 22A may communicate with an inverter of a permanent magnet generator. Exhaust 50 from turbo-generator 20A may be combined with the exhaust from gas turbine engine into a single exhaust flow 36 from system 60. In this manner, no additional exhaust conduits out of gas turbine engine 18A are required for turbo-generator 20A.

In some examples, a parallel turbine approach may be used to provide a power offtake, depending on altitude. Increasing the HP speed may further increase offtake. Integrated generators may be speed limited by the shaft components.

Figure 5:
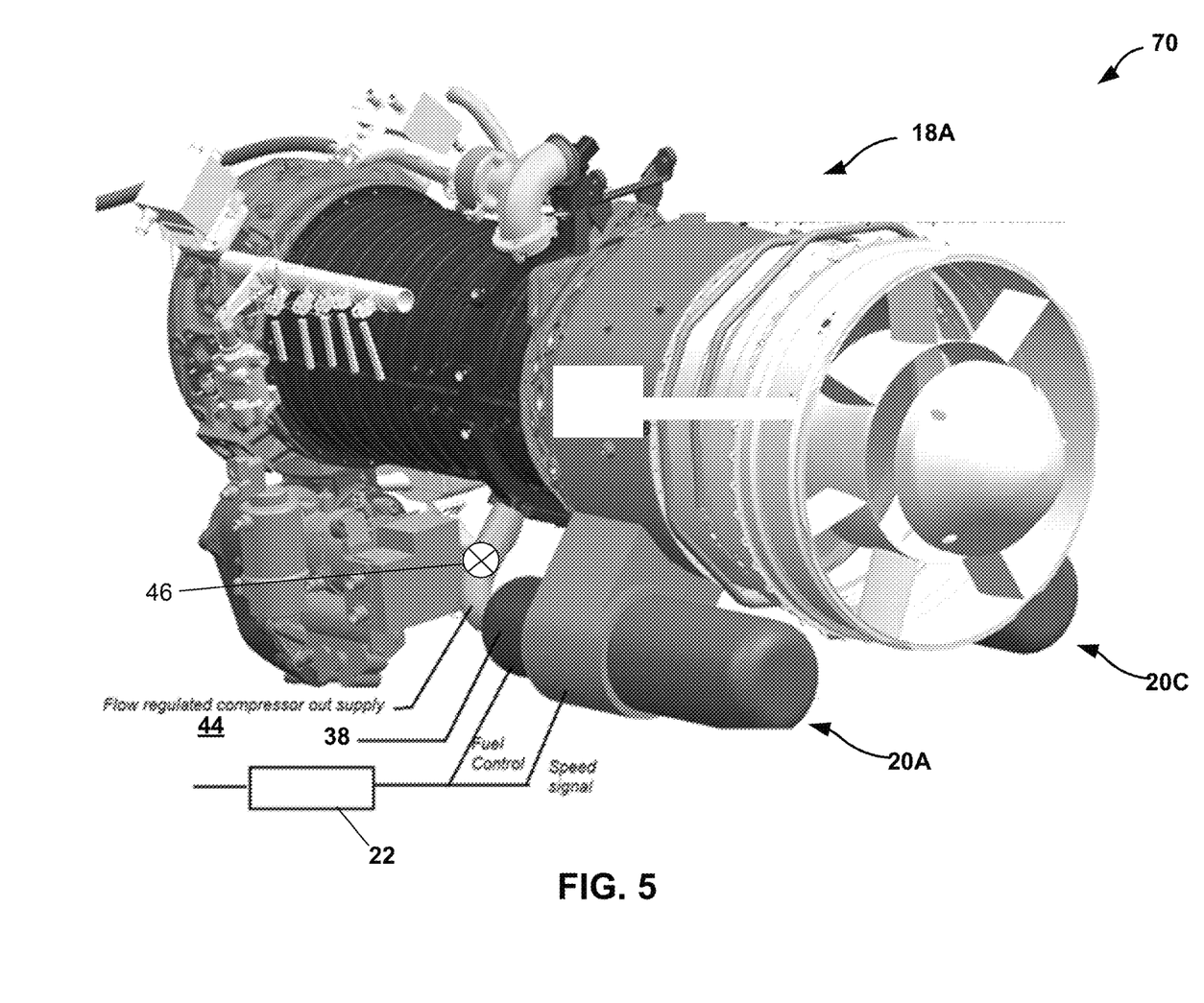
FIG. 5 is a conceptual and schematic diagram illustrating another example propulsion and electrical energy generation system in accordance with an example of the present disclosure.

FIG. 5 is a conceptual and schematic diagram illustrating another example propulsion and electrical energy generation system 70 in accordance with an example of the present disclosure. In some examples, system 70 of FIG. 5 represents one example implementation of the example system 30 of FIG. 2. For ease of description, features that are the same or similar to that of system 30 are numbered similarly.

As shown, system 70 includes gas turbine engine generator 18A, first turbo-generator 20A and second turbo-generator 20C. The drive is not restricted to generators and could drive cooling systems or other devices. Each turbo-generator 20A and 20C may receive bleed air from a compressor of gas turbine engine 18A. For example, FIG. 5 illustrates bleed air 44 (described as flow regulated compressor out supply) being supplied to combustor 38 of turbo-generator 20A. Controller 22 is configured to control the operation of turbo-generator 20A, e.g., as described above with regard to system 30 of FIG. 2. Turbo-generator 20A is mounted directly to gas turbine engine 18A (e.g., on mounting features provided or added to the engine section behind the compressor as shown). System 70 also includes second turbo-generator 20C that is similarly mounted to gas turbine engine 18A, and function similar to that of first turbo-generator 20A using bleed air supplied from a compressor of gas turbine engine 18A. Many systems also require high level of cooling which can be driven from one or both of these systems. This also may be configured to provide some level of redundancy for important or critical systems.

In some examples, system 70 may be described as fully integrated dual high speed fueled take off mounting pads. Such a configuration may provide a drive system for a high power generator 20A, e.g., up to 24000 rpm. In addition, the second pad (e.g., generator 20C) can drive an air cycle cooling system to increase air density at high altitudes. In some examples, system 70 may be able to produce high engine power extraction without shaft loading. In some examples, generator 20A and/or 20C allow for high speed generation and nearly constant speeds by fuel control. The parallel LP system may not not affect surge margin by loading the HP shaft. Additionally, as described herein, generators 20A and 20C may be added without any additional intake or exhaust ducts required. The air frame observables may not require modification and the engine propulsion system may be separate mechanically.

Figure 6:
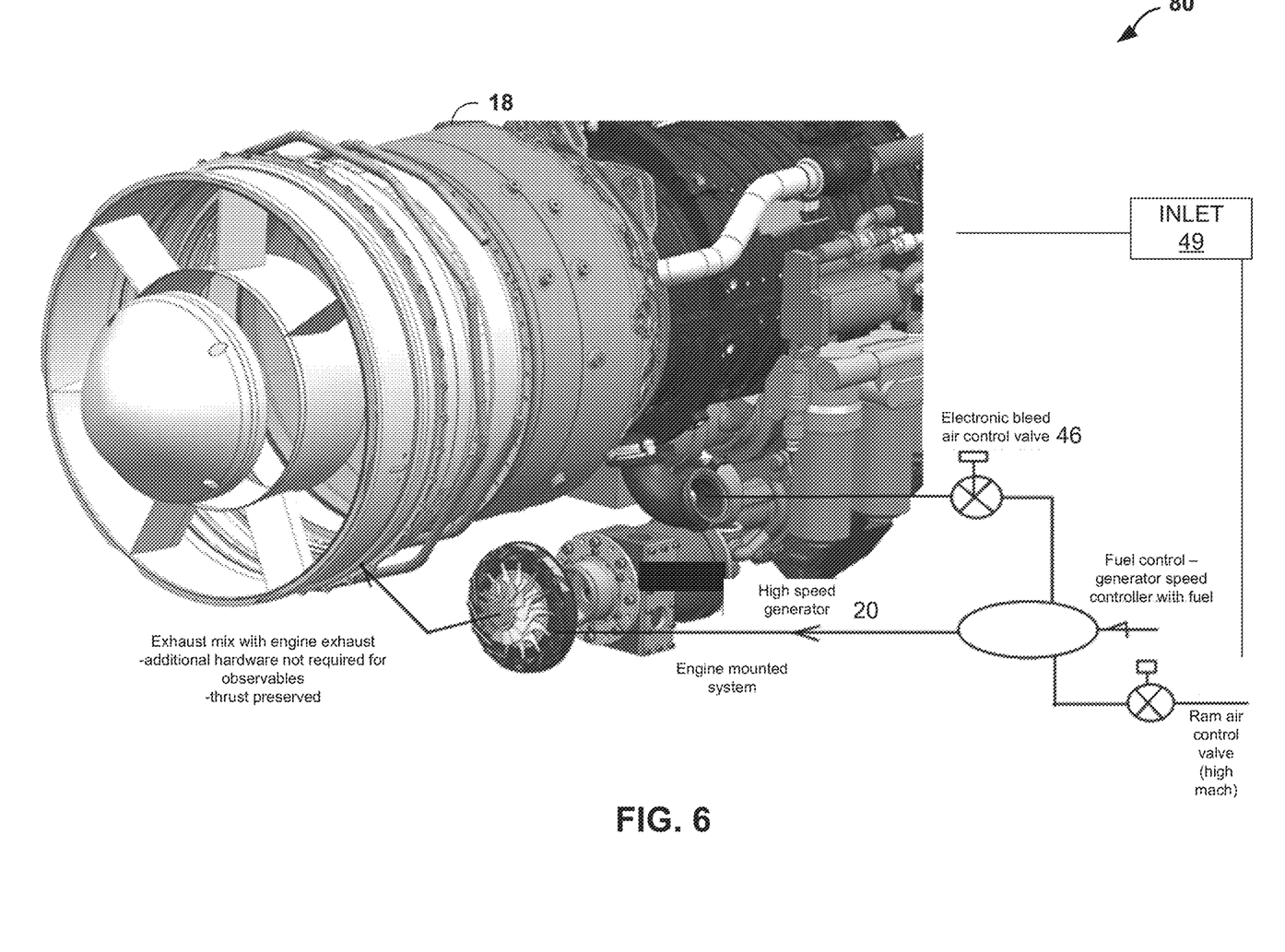
FIG. 6 is a conceptual and schematic diagram illustrating another example propulsion and electrical energy generation system in accordance with an example of the present disclosure.

FIG. 6 is a conceptual and schematic diagram illustrating another example propulsion and electrical energy generation system 80 in accordance with an example of the present disclosure. In some examples, system 80 of FIG. 6 represents one example implementation of the example system 30 of FIG. 2. For ease of description, features that are the same or similar to that of system 30 are numbered similarly.

In some examples, system 80 may be integrated engine mounted system. Generator 20 may be mounted to the engine 18 to provide the power off-take without mechanical means. This may provide an approach which maintains the aircraft aerodynamics and observables, providing a parallel power turbine propulsion system. In some examples, system 80 may also provide an RAM turbine in event of an engine stall, or, in supersonic aircraft the inlet could be switched to ram air if the speed is sufficient.

Figure 11:
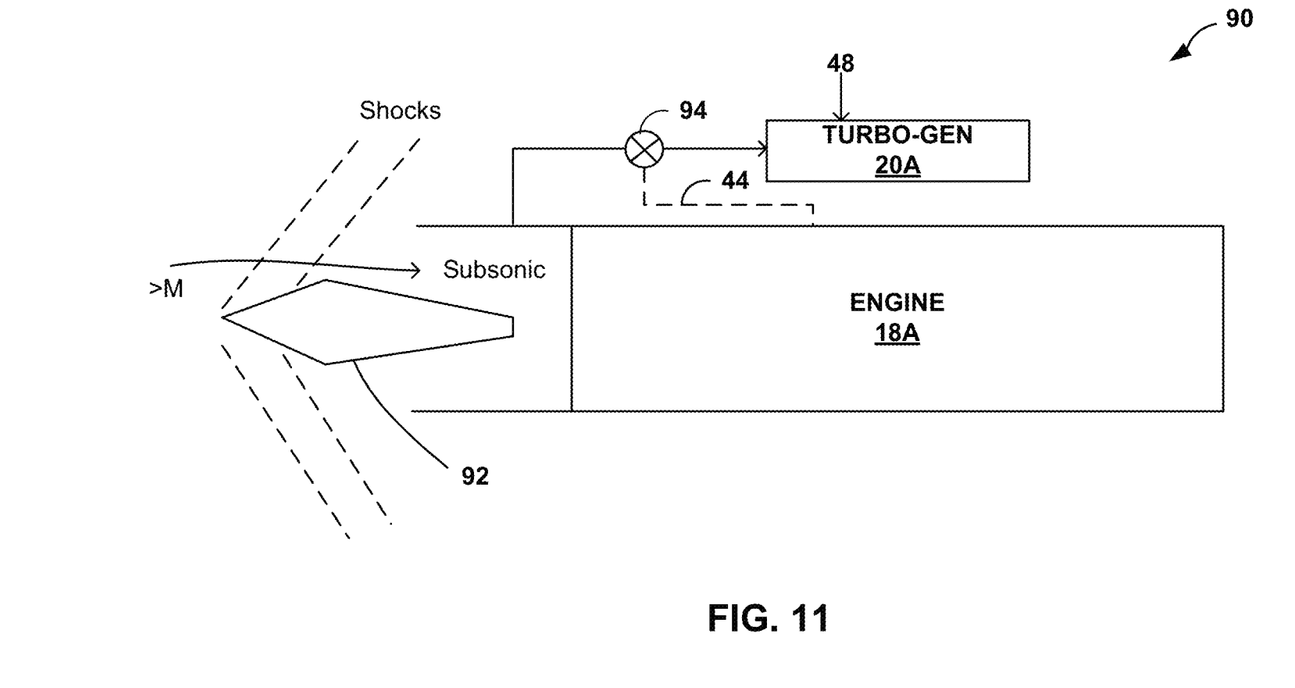
FIG. 11 is a conceptual and schematic diagram illustrating another example propulsion and electrical energy generation system in accordance with an example of the present disclosure.

As shown in FIG. 6, the turbine engine 18 can be an axial or radial type turbine, and the generator 20 can be near the front of the engine 18. In this example, bypass of the compressor may be allowed in high speed aircraft where ram inlet 49 provides sufficient mass flow and pressure. The inlet may be connected to the engine inlet which has been reduced to a subsonic flow regime. FIG. 11 is a conceptual schematic diagram illustrating a system 90 including a bypass of the compressor of engine 18A. As high speed, a shock break on an aircraft reduces the flow relative to engine 18A so that it is subsonic to the inlet. For example, nose 92 may be configured to create shocks specific to speed to ensure that it slows the inlet to subsonic efferently. The inlet is at high pressure due to ram compression. At a high enough speed (e.g., high enough Mach), compressed bleed air 44 from compressor 24 may not be needed so system 90 may include bypass valve 94 to the area of high pressure to supply combustor 38 with high pressure fluid rather than (or in addition to) bleed air 44 from compressor 24. The intake to the valve is the same intake air at the front of engine 18A (e.g., inside the nacelle).

Figure 7:
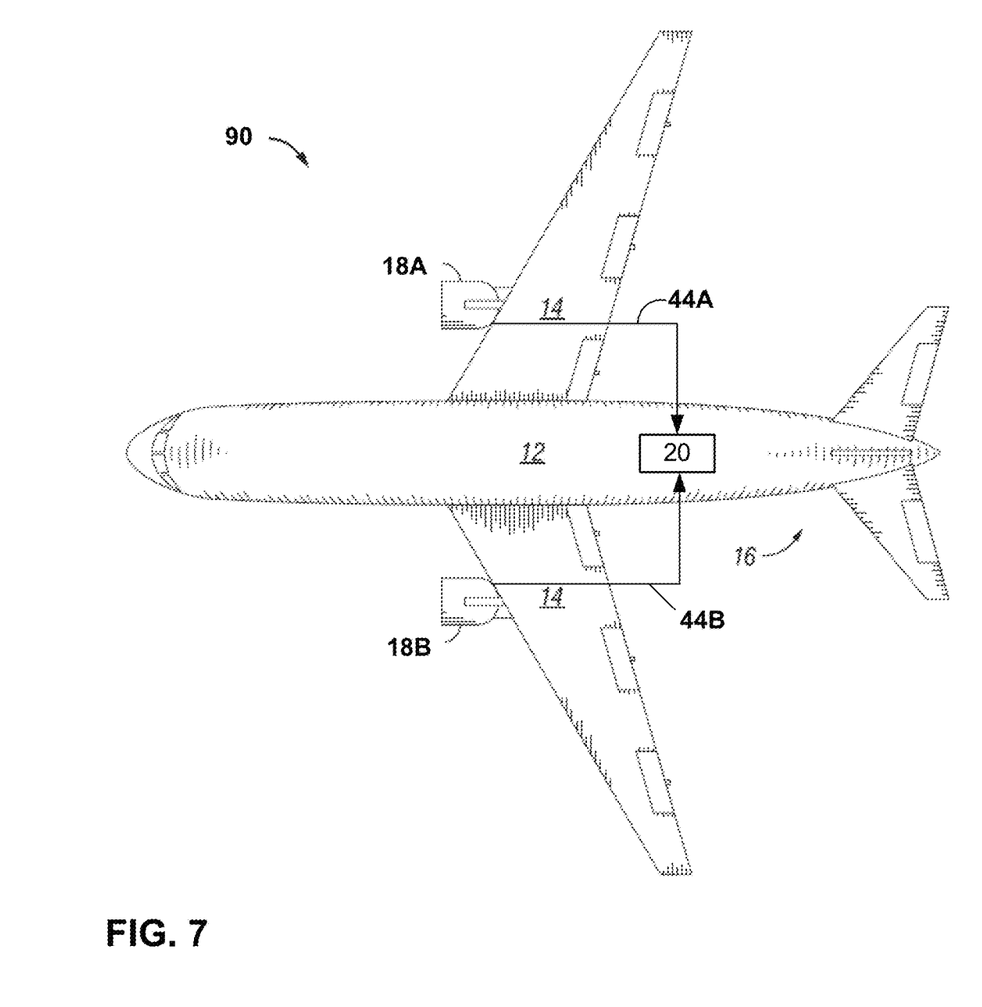
FIG. 7 is a conceptual diagram illustrating another example vehicle in accordance with an example of the present disclosure.

FIG. 7 is a conceptual diagram illustrating an example vehicle in accordance with an example of the present disclosure. The vehicle include aircraft 90 which may be the same or substantially similar to that of aircraft 10 in FIG. 1. However, unlike that of aircraft 10, aircraft 90 includes turbo-generator remotely mounted in fuselage 12 of aircraft 90 rather than turbo-generators 20A and 20B directly mounted on gas turbine engines 18A and 18B, respectively. Turbo-generator 20 may be the same or substantially similar to that of turbo-generator 18A described with regard to FIG. 2. However, turbo-generator 20 is configured with a combustor (not shown in FIG. 7) that receives bleed air 44A and 44B from the compressors of gas turbine engines 18A and 18B, respectively. As described herein, turbo-generator 20 is configured to generate electrical energy using bleed air 44A and 44B supplied to the combustor, e.g., rather than receiving compressed fluid from a separate compressor dedicated to supplying the combustor with compressed fluid. While aircraft 90 is shown in FIG. 7 as including only a single turbo-generator 20, in other examples, fuselage 12 may include multiple turbo-generators, e.g., including two turbo-generators each being supplied individually from bleed air 44A or 44B, or with a combination of bleed air 44A and 44B.

In some examples, engines 18A and 18B have significant mass flow compared to the mass flow required to provide generator combustion. This may allow a single generator 20 of high speed to operate, e.g., in an auxiliary bay. In such an example, only exhaust ducting may be required to add turbo-generator 20, with intake is still thru the primary engines 18A and 18B. The exhaust could be a "dual" configuration and tied into the engine exhaust on each side. Such a configuration may allow generator 20 to be retrofit while maintaining inlets and exhausts, observables, without aircraft modification. Such a system may be used in ground vehicles using turbine engines. This would provide a means of high power generation on these vehicles for electrical systems with relatively high electrical energy operating requirements.

Example

Modeling of the performance of an example system including a gas turbine engine and turbo-generator in accordance with some examples of the disclosure was performed to evaluate one or more aspects of the disclosure. In particular, a system in which the combustor of the turbo-generator was configured to received compressed fluid in the form of bleed air from the compressor of the gas turbine engine of an aircraft was modeled. The power extraction for this is analysis was a simple Brayton cycle operating at constant speed. Losses were not considered in the cycle.

Figure 8:
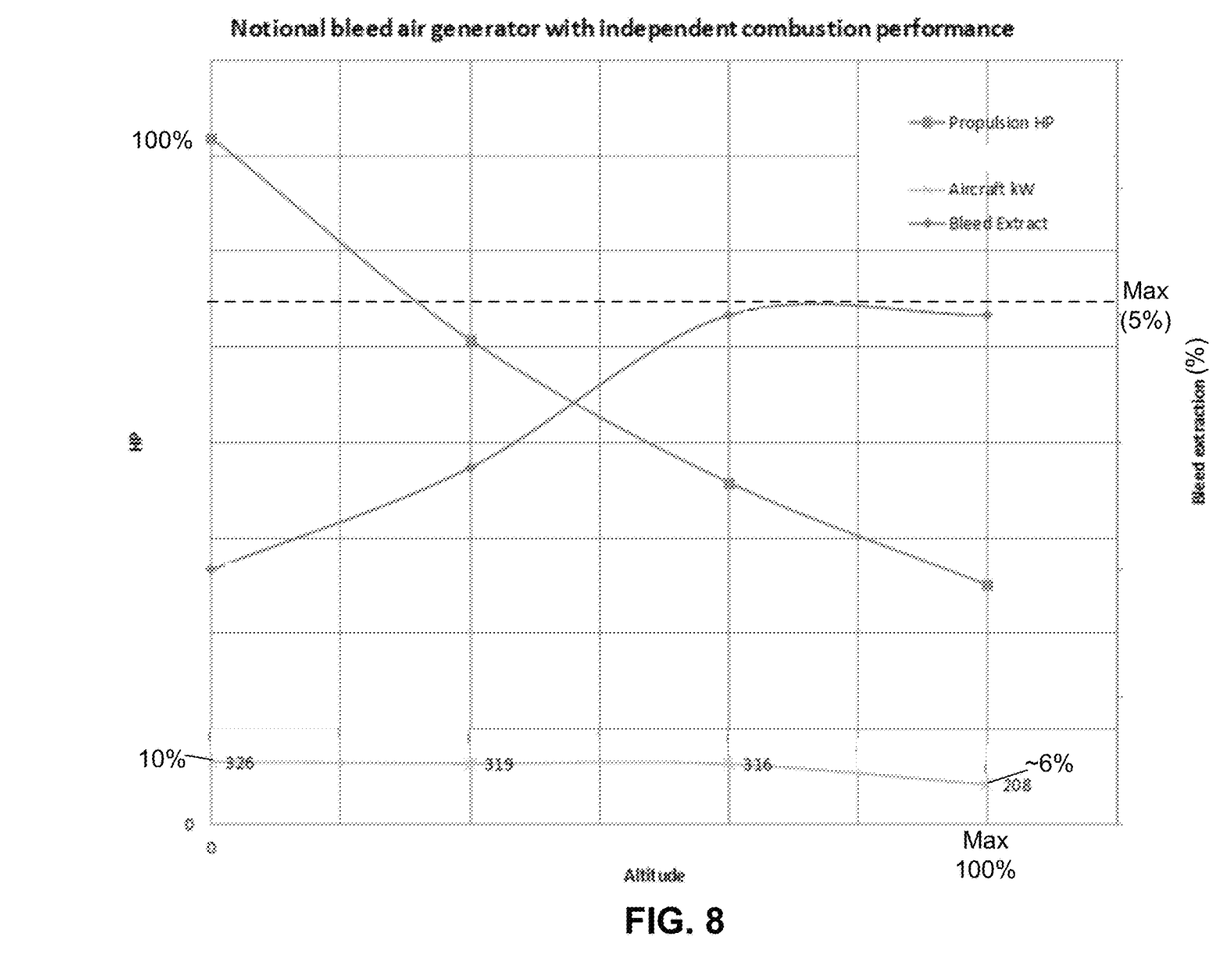
FIG. 8 is a plot illustrating results of modeling of the performance an example system in accordance with an example of the disclosure.

FIG. 8 is a plot illustrating power (HP %) versus altitude (as a percentage of maximum) versus bleed extraction percent (the amount of the fluid compressed by the compressor that is directed to the combustor of the turbo-generator). Power was plotted for the engine and turbo-gen versus a typical altitude profile. The bleed air supply increases as necessary, and at about ⅔ maximum generated power may begin to reduce. This may be extended with addition of a compression stage. For the purpose of the modeling, a maximum amount of bleed air extraction was defined, which is shown in the plot of FIG. 7.

As shown in FIG. 8, the results show the modeled system to be nearly 10% of engine power, well exceeding that of mechanical systems which have been integrated. In some examples, mechanical systems are restricted by shaft and bearing systems, available space, changes to the engine, and air craft mounting a center of gravity. This system minimizes integration complexities and achieves high power.

Various examples have been described. These and other examples are within the scope of the following claims.

What is claimed is:

1. A propulsion and electrical generation system comprising:
    a gas turbine engine including a first turbine, a first combustor, a compressor and a bleed air outlet from the compressor, wherein the compressor is configured to compress a fluid, wherein a portion of the compressed fluid is directed out of the bleed air outlet to define a bleed air from the compressor and another portion of the compressed fluid is directed to the first combustor, wherein the first combustor is configured to drive the first turbine; and
    a turbo-generator including a second combustor and a second turbine separate from the first turbine, wherein the second combustor includes a fuel inlet and a bleed air inlet, wherein the bleed air inlet is in fluid communication with the bleed air outlet from the compressor, wherein the second combustor is configured to receive the bleed air via the bleed air inlet from the bleed air outlet of the gas turbine engine and receive fuel via the fuel inlet, wherein the second combustor is configured to combust the received fuel with the received bleed air to drive the second turbine, wherein the turbo-generator is configured to generate electrical energy via the second turbine driven by the combustion of the fuel by the second combustor, and wherein the second combustor of the turbo-generator does not receive a compressed fluid from another compressor separate from the compressor of the gas turbine engine.

2. The system of claim 1, wherein the gas turbine engine includes a first exhaust outlet for the first turbine and the first combustor and the turbo-generator includes a second exhaust outlet for the second turbine and the second combustor, wherein the first exhaust outlet and second exhaust outlet are fluidically coupled such that the first exhaust outlet and second exhaust outlet are combined into a single exhaust outlet.

3. The system of claim 2, wherein a controller is configured to adjust the amount of bleed air received by the second combustor of the turbo-generator via the bleed air control valve based on a desired amount of power to be generated by the turbo-generator.

4. The system of claim 1, further comprising:
    a first fuel supply source configured to supply fuel to the first combustor of the gas turbine engine, and
    a second fuel supply source that is separate from the first fuel supply source configured to supply fuel to the second combustor of the turbo-generator, wherein the first fuel supply source is configured to supply the fuel to the first combustor of the gas turbine engine independent from the second fuel supplied to the second combustor of the turbo-generator by the second fuel supply source.

5. The system of claim 1, wherein the bleed air is received by the second combustor of the turbo-generator from the compressor of the gas turbine engine without being compressed by another compressor after exiting the bleed air outlet of the compressor of the gas turbine engine.

6. The system of claim 1, wherein the compressor of the gas turbine engine supplies pressure from a high pressure stage of the compressor section.

7. The system of claim 1, wherein a total power of the gas turbine engine increases as a result of the bleed air received by the second combustor of the turbo-generator.

8. The system of claim 1, wherein the turbo-generator is mounted on the gas turbine engine.

9. The system of claim 1, further comprising a vehicle, wherein the gas turbine engine is configured to provide propulsion to the vehicle.

10. The system of claim 9, wherein the vehicle comprises an aircraft.

11. The system of claim 1, further comprising a controller configured to control a flow of the fuel and the bleed air to the second combustor of the turbo-generator.

12. The system of claim 1, further comprising:
a bleed air control valve between the bleed air outlet and the bleed air inlet; and
a controller including a control circuitry, wherein the controller is configured to adjust the bleed air control valve to adjust an amount of the bleed air received by the combustor of the turbo-generator.

13. The system of claim 1, wherein the first turbine is driven by combustion of the first combustor and not by the combustion of the second combustor.

14. A method comprising:
compressing a fluid via a compressor of a gas turbine engine, the gas turbine engine including a first turbine, a first combustor, and the compressor, wherein a portion of the compressed fluid is directed out of a bleed air outlet of the compressor to define a bleed air from the compressor and another portion of the compressed fluid is directed to the first combustor, wherein the first combustor is configured to drive the first turbine;
receiving the bleed air via a bleed air inlet of a second combustor of a turbo-generator, the turbo-generator including the second combustor and a second turbine, wherein the second turbine is separate from the first turbine, wherein the bleed air inlet of the second combustor is in fluid communication with the bleed air outlet of the gas turbine engine;
receiving a fuel via a fuel inlet of the second combustor of the turbo-generator with the received bleed air; and
combusting the received fuel with the received bleed air with the second combustor of the turbo-generator, wherein the turbo-generator is configured to generate electrical energy via the second turbine driven by the combustion of the fuel by the second combustor, wherein the second combustor of the turbo-generator does not receive a compressed fluid from another compressor separate from the compressor of the gas turbine engine.

15. The method of claim 14, wherein the gas turbine engine includes a first exhaust outlet for the first turbine and the first combustor and the turbo-generator includes a second exhaust outlet for the second turbine and the second combustor, wherein the first exhaust outlet and second exhaust outlet are fluidically coupled such that the first exhaust outlet and second exhaust outlet are combined into a single exhaust outlet.

16. The method of claim 14, further comprising adjusting, via a controller including a control circuitry, a bleed air control valve between the bleed air outlet and the bleed air inlet to adjust an amount of the bleed air received by the second combustor of the turbo-generator.

17. The method of claim 14, further comprising:
supplying fuel to the first combustor of the gas turbine engine from a first fuel supply source, and
supplying fuel to the combustor of the turbo-generator from a second fuel supply source that is separate from the first fuel supply source.

18. The method of claim 14, further comprising generating propulsion to a vehicle via the gas turbine engine.

19. The method of claim 14, further comprising at least one of receiving or switching to a lower stage compression including an inlet when ram compression is viable.

20. A propulsion and electrical generation system comprising:
a gas turbine engine including a first turbine, a first combustor, a compressor and a bleed air outlet from the compressor, wherein the compressor is configured to compress a fluid, wherein a portion of the compressed fluid is directed out of the bleed air outlet to define a bleed air from the compressor and another portion of the compressed fluid is directed to the first combustor, wherein the first combustor is configured to drive the first turbine; and
a turbo-generator including a second combustor and a second turbine separate from the first turbine, wherein the second combustor includes a fuel inlet and a bleed air inlet, wherein the bleed air inlet is in fluid communication with the bleed air outlet from the compressor, wherein the second combustor is configured to receive the bleed air via the bleed air inlet from the bleed air outlet of the gas turbine engine and receive fuel via the fuel inlet, wherein the second combustor is configured to combust the received fuel with the received bleed air to drive the second turbine, wherein the turbo-generator is configured to generate electrical energy via the second turbine driven by the combustion of the fuel by the second combustor;
a first fuel supply source configured to supply fuel to the first combustor of the gas turbine engine, and
a second fuel supply source that is separate from the first fuel supply source configured to supply fuel to the second combustor of the turbo-generator, wherein the first fuel supply source is configured to supply the fuel to the first combustor of the gas turbine engine independent from the second fuel supplied to the second combustor of the turbo-generator by the second fuel supply source.

* * * * *